Figure 5:
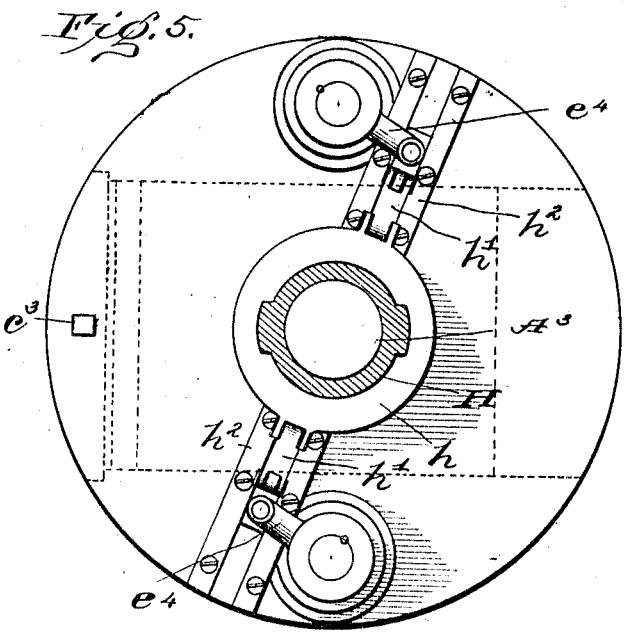

E. BIVERT.
FLUID OPERATED CLUTCH.
APPLICATION FILED SEPT. 13, 1901.
990,188.
Patented Apr. 18, 1911.
4 SHEETS—SHEET 1.
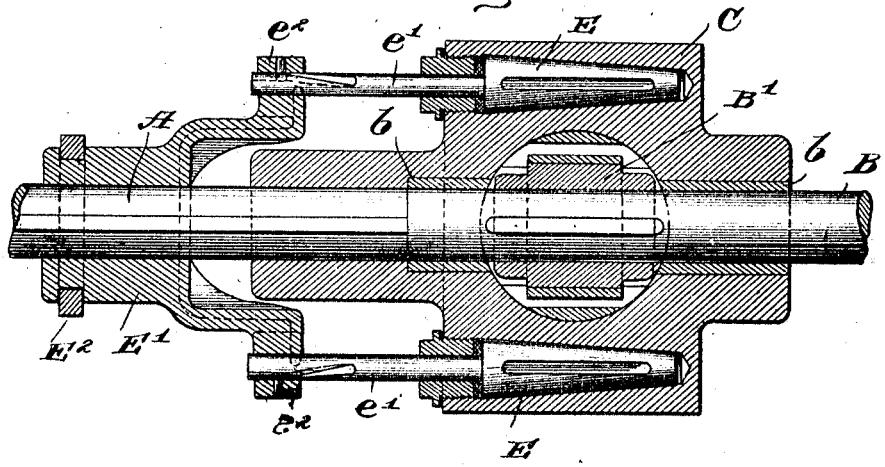
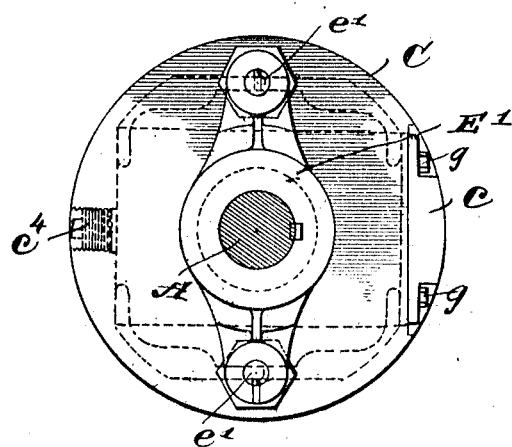
Witnesses:
Inventor:
Eugene Bivert E. BIVERT.
FLUID OPERATED CLUTCH.
APPLICATION FILED SEPT. 13, 1901.
990,188.
Patented Apr. 18, 1911.
4 SHEETS—SHEET 2.
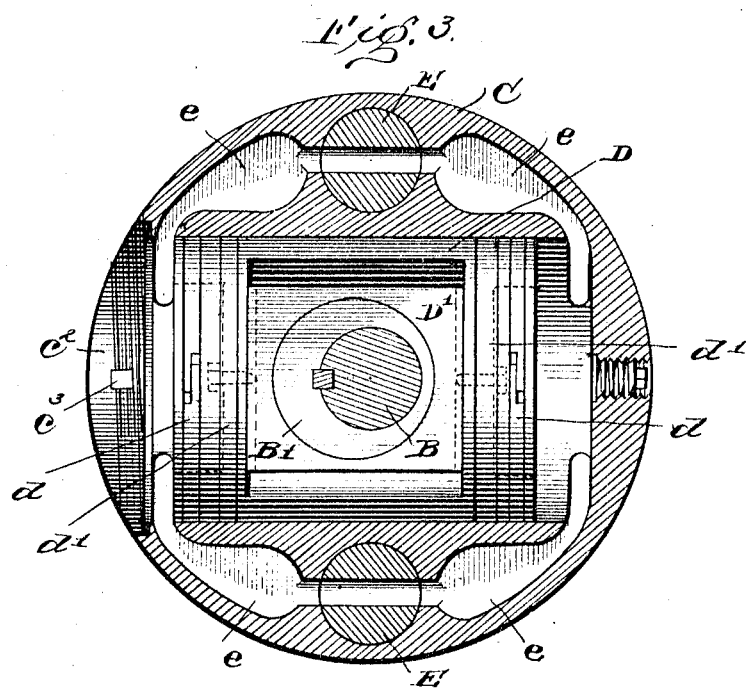
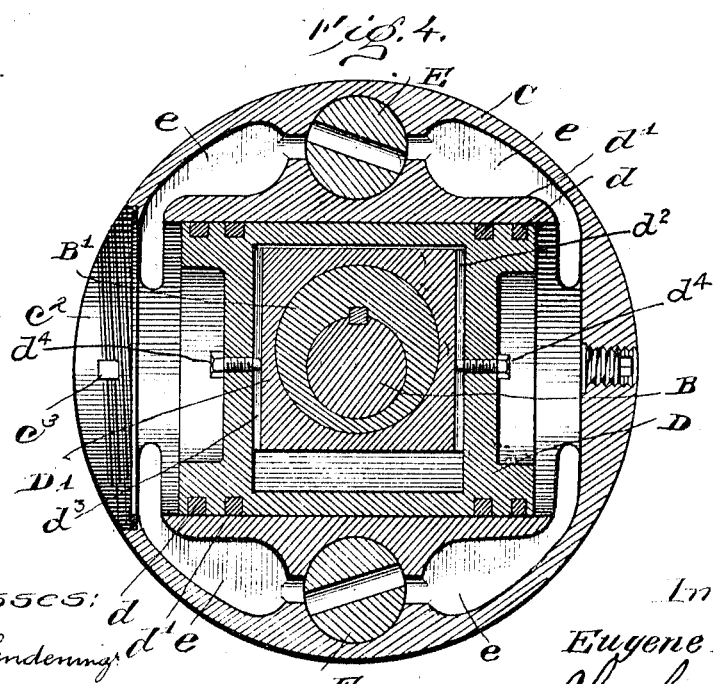
Witnesses:
J. H. Glendening
G. A. Tauberschmidt
Inventor
Eugene Bivert
By Charles W. Fills
Attorney

E. BIVERT.
FLUID OPERATED CLUTCH.
APPLICATION FILED SEPT. 13, 1901.

990,188.

Patented Apr. 18, 1911.
4 SHEETS—SHEET 3.

Witnesses:
J. H. Glendenning
G. A. Faubenschmidt

Inventor
Eugene Bivert
By Charles W. Fieco
Attorney

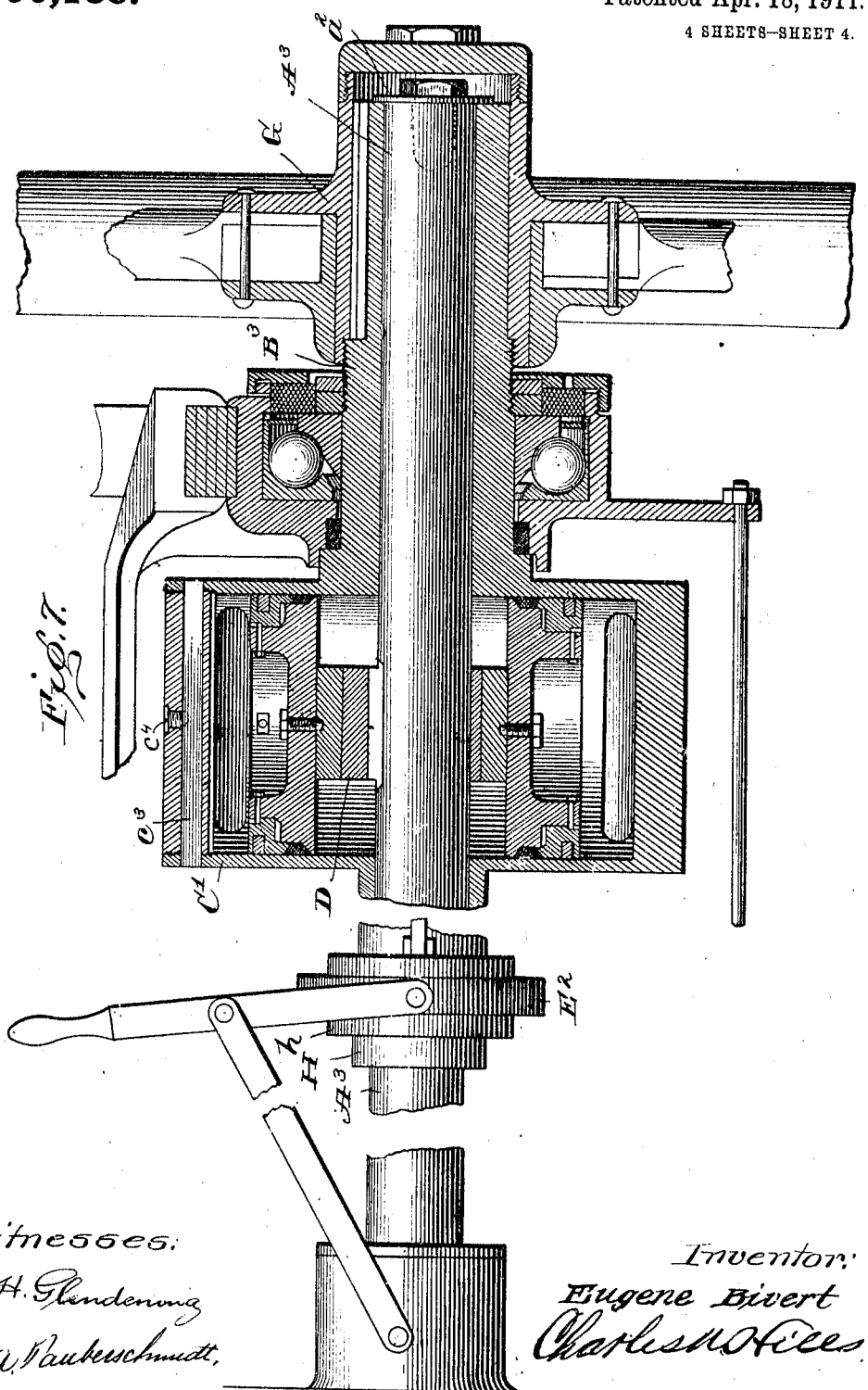

UNITED STATES PATENT OFFICE.

EUGENE BIVERT, OF CHICAGO, ILLINOIS, ASSIGNOR, BY MESNE ASSIGNMENTS, TO PATRICK CORCORAN, OF CHICAGO, ILLINOIS.

FLUID-OPERATED CLUTCH.

990,188.  Specification of Letters Patent.  Patented Apr. 18, 1911.

Application filed September 13, 1901. Serial No. 75,264.

*To all whom it may concern:*

Be it known that I, EUGENE BIVERT, a citizen of the Republic of France, and a resident of Chicago, in the county of Cook and State of Illinois, have invented certain new and useful Improvements in Fluid-Operated Clutches; and I do hereby declare that the following is a full, clear, and exact description thereof, reference being had to the accompanying drawings, and to the letters of reference marked thereon, which form a part of this specification.

This invention relates more particularly to means for transmitting power from a driving to a driven shaft and has for its object a construction which permits the driving shaft to rotate continuously independently of the rotation or non-rotation of the driven shaft and embracing fluid operated means for actuating the driven shaft at any desired rate of rotation desired by the operator, within the speed of the driving shaft.

Some of the serious objections to the clutches and variable speed transmission devices heretofore used have been, that, ordinarily, no means, or inadequate means have been provided for obviating the jar or shock incident to throwing the clutch into operation. Furthermore, it has been difficult, if not impossible with most devices to vary the speed of the driven shaft without varying the speed of the driving shaft. In the few hydraulic gears and clutches heretofore devised, the multiplicity of parts has rendered the same unsatisfactory in operation and subject to getting frequently out of order through breakage of the parts or through leakage. In those, in which stuffing boxes are used for the shafts the friction in said boxes is considerable thus consuming the power. Furthermore, the rotation of the shaft soon wears away the packing and results in leakage. In my construction, stuffing boxes are dispensed with, the working parts are few in number and of exceedingly simple construction, thus not only greatly reducing the expense of production, but insuring greater durability and greater efficiency.

The invention embraces many novel features of construction and consists in the matters hereinafter described and more fully pointed out and defined in the appended claims.

Figure 6:
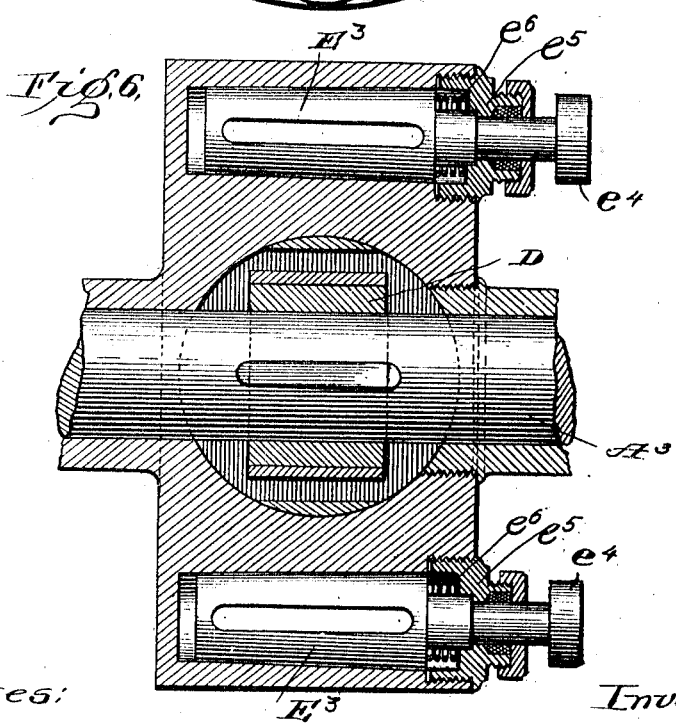

In the drawings: Figure 1 is a longitudinal section of a device embodying my invention. Fig. 2 is an end elevation of the same. Fig. 3 is a transverse section showing the valves in their open position. Fig. 4 is a view similar to Fig. 3 but showing the valves partly closed, in which position the driven shaft will be rotated at a speed less than that of the driving shaft. Fig. 5 is an end elevation illustrating one form of valve movements. Fig. 6 is a longitudinal section of the casing showing the shaft and valve closures in elevation. Fig. 7 is a longitudinal section of a slightly modified form of my invention showing the same as embodied in a motor vehicle.

In said drawings: A indicates the driven shaft and B the driving shaft.

C indicates a cylindric casing or shell having a central cylindric transverse chamber, as shown more fully in Figs. 1, 3 and 4. The shaft A is rigidly connected at one end in the end of said casing axially thereof as shown in Fig. 1. The inner end of the shaft B extends through the opposite end of the casing at its axis and as shown, a sleeve or bushing $b$ of any desired bearing material surrounds said shaft and fits tightly in the casing through which the same extends. Rigidly keyed on said shaft B is an eccentric $B^1$ which fits closely in a complementally apertured laterally sliding block $D^1$ which is seated centrally in a double ended piston D. Said piston fits closely in the cylindric recess of said casing and is adapted to be reciprocated longitudinally thereof by the throw of the eccentric. Preferably close fitting piston rings $d$—$d^1$ of any desired kind are provided on the head of the piston in a familiar manner, and any desired packing material may be used in connection therewith if preferred. Parallel with said shafts and in each side of said casing C, is a valve seat adapted to receive a valve closure E. Said valve closures are slotted longitudinally as shown in Figs. 1, 3, 4 and 6; said slots communicating in one position of the closure with the enlarged ports shown at $e$—$e$ in the casing, which communicates with the cylinder at each end of the same through a relatively large opening or port. Said valves may obviously be operated in many different ways. As shown in Fig. 1, each of said valve closures is provided with an integral stem $c^1$ which extends outwardly parallel with the shafts and is provided with a longitudinal spiral slot. A yoke $E^1$ is centered on the shaft A and provided with laterally directed arms $e^2$—$e^2$ each of which is apertured to receive one of the valve stems and each provided with a transverse pin which engages in said slot. Longitudinal movement of the yoke on the shaft acts to rotate the valve closures to an open or closed position. Any means may be employed to actuate the yoke. As shown, a lever $E^2$ provided with a yoked end engages a collar carried on the end of the yoke $E^1$ and affords means for shifting said yoke longitudinally and thereby adjusting the valves.

On one side of the casing and forming a head for one end of the cylinder is the cap $c$ which may be rigidly bolted to the casing or shell, by means of stud bolts or secured thereto in any desired manner. As shown in Figs. 3 and 4 the same is circular and screw threaded and engages in a complemental screw threaded aperture in the side of the casing concentric with the cylinder. In this construction, for the purpose of locking said cap, indicated by $c^2$, from rotation, an aperture is provided therethrough parallel with the shaft and adapted to receive a bar $c^3$ which engages in said cap and in the casing on each side of the same and which is held from longitudinal movement by means of a set screw as shown in Fig. 7.

$c^4$ indicates a threaded aperture extending through the shell and closed by a close fitting threaded plug as shown in Fig. 2, and through which, oil or glycerin or other fluid may be poured to fill the casing.

In the slightly modified form of my invention illustrated in Fig. 7, the driving shaft $A^3$ is indicated as extending through the casing $C^1$ and provided with an eccentric D thereon, as before described. The driven shaft $B^3$, in this form of my invention, is integral with the casing and apertured to permit the driving shaft to extend therethrough. A collar is secured on the end of the shaft $A^3$ and engages with the end of the driven shaft. In the construction shown in Fig. 7, in which a portion of the running gear of an automobile is illustrated, the automobile wheel G is rigidly keyed, or otherwise rigidly secured on the end of the driven shaft. As shown, also, a ball or other anti-friction bearing one of the members of which is secured on said shaft $B^3$ and the other of which is secured on the bed of the automobile, may be provided between the wheel and the casing. Obviously, the valves in this construction, may be as before described. As shown in Figs. 5 and 6 the valve closures $E^3$—$E^3$ are cylindric and slotted axially as before described and the valve stems extend through suitable stuffing boxes $e^5$—$e^5$ and the ends of the valve stems are provided with laterally directed arms $e^4$—$e^4$. Springs $e^6$—$e^6$ are secured between the valves $E^3$—$E^3$ and the stuffing boxes which exert an inward pressure on the valves thus taking up all the wear thereon. A collar H is rigidly secured on the shaft $A^3$ in any desired manner and a collar $h$ rotative therewith and longitudinally movable thereon is provided with laterally directed arms $h^1$ hinged thereon, the outer ends of which are adapted to slide in ways $h^2$ secured diametrically on the end of the casing as shown in Fig. 5. The arms $e^4$ pivotally engage in the outer ends of said laterally directed arms $h^1$, so that movement of the collar $h$ toward the casing acts to rotate the valve closure in one direction, while opposite motion therefrom rotates the valve closure oppositely thereby opening or closing the valve.

The operation is as follows: The parts being assembled, glycerin, oil or other fluid is poured into the cylinder, filling the same and the ports, and the filling aperture is tightly closed. The driving shaft is free to rotate in either direction, so long as the valves are open, inasmuch as the piston reciprocated by the eccentric on said shaft acts to force the fluid in the casing from end to end in the cylinder through the ports. When it is desired to impart motion to the driven shaft the valves are turned to their closed position, and the resistance of the fluid in one end of the cylinder prevents longitudinal movement of the piston. The rotation of the driving shaft is thus imparted to the casing causing the same, with the driven shaft, to rotate. Obviously, when the chambers are full of a practically incompressible fluid, there can be no lost motion and the driven shaft will rotate at practically the same rate as the driving shaft. A stuffing box or gland is not required on the driving shaft inasmuch as no more fluid will pass the piston heads than will be required for lubrication. Should it be desired to operate the driven shaft to any speed less than that of the driving shaft, it may be accomplished without changing the rate of rotation of the driving shaft, by partly closing the valves, as shown in Fig. 4. This retards the flow of the fluid from end to end of the cylinder and in a like degree reduces the rate of travel of the piston with corresponding reduction of the rate of rotation in the driven shaft. The speed of the driven shaft is thus perfectly regulated by the degree of opening of the valves. Obviously, guides of any desired kind may be provided for the block $D^1$. As shown, however, the block is provided with grooves $d^2$—$d^3$ at opposite ends longitudinally of its movement and stud bolts $d^4$ secured in the piston heads extend inwardly and engage in each groove thus holding the block from movement longitudinally of the shaft, while permitting free movement transversely of the shaft.

Obviously, my invention is adaptable for any purpose for which a clutch of any desired kind may be desirable or for use wherever a variable speed gearing is required, and either shaft may be the driven shaft.

Obviously, details of construction may be varied without departing from the principle of my invention.

I claim as my invention:

1. The combination with a rotative casing provided with a chamber therein at right angles with the axis of rotation of the casing, a close fitting reciprocating piston in said chamber, a shaft extending into the casing and chamber, means thereon for reciprocating the piston, a grooved sliding block actuated by said means, means rigidly secured to the piston engaging in the grooves in said block for guiding the block, valves on each side of said chamber and communicating by passages through the walls of the casing with the respective ends of the chamber, and means for locking the piston from movement within the casing operated by closing the valves.

2. The combination with a rotating casing having ports extending through the walls of the same, of an axial shaft rigidly connected therewith, a transverse cylindric chamber in said casing having its center located at the intersection of the axes of the casing, a piston therein, a rotative shaft in axial alinement with the first mentioned shaft and extending through said piston, means for reciprocating said piston by the rotation of said shaft, valves in said ports in the casing, stems connected to the valves having spiral slots therein, means adapted to reciprocate in the spiral slots for rotating the valves, and means operated by the valves adapted to permit said piston to reciprocate freely in the chamber or to lock the same from movement therein.

3. The combination with a rotative casing having a cylindric chamber therein of a reciprocating piston in said chamber, a shaft extending axially within said casing, means thereon for reciprocating the piston, valves acting to lock said piston from movement with respect to the casing and means slidably connected with said valves and movable longitudinally thereof for actuating said valves.

4. The combination with a rotative casing having a closed chamber of a reciprocating piston in said chamber, a shaft extending axially within said casing, means thereon for reciprocating the piston, valves acting to lock said piston from movement with respect to the casing, outwardly extending stems on said valves, a driven shaft, rotatable with the casing and means engaging said stems and slidably movable thereon and on the driven shaft for actuating said valves.

5. In a device of the class described, a rotative casing, a valve in the side thereof, a spirally grooved stem extending outwardly from said valve and an arm rotative with said casing and adapted to move to and from the same to operate said valve.

6. In a device of the class described the combination with a rotative casing provided with communicating ports, of a reciprocating piston therein, a yoke rotative therewith, valves disposed parallel with the axis of rotation of the casing and controlling the flow of fluid through said ports, an outwardly extended, spirally slotted stem on each valve, parts on said yoke which engage in said slots of the stem and means for moving the yoke longitudinally of the axis of rotation thereby acting to rotate the valves.

In testimony whereof, I have hereunto subscribed my name in the presence of two subscribing witnesses.

EUGENE BIVERT.

Witnesses:
C. W. HILLS,
L. J. DELSON.